(12) United States Patent
Kodama et al.

(10) Patent No.: US 8,988,850 B1
(45) Date of Patent: Mar. 24, 2015

(54) CERAMIC ELECTRONIC COMPONENT

(71) Applicant: Murata Manufacturing Co., Ltd, Nagaokakyo-shi, Kyoto-fu (JP)

(72) Inventors: Satoshi Kodama, Nagaokakyo (JP); Yosuke Terashita, Nagaokakyo (JP); Seiji Katsuta, Nagaokakyo (JP)

(73) Assignee: Murata Manufacturing Co., Ltd, Kyoto (JP)

( * ) Notice: Subject to any disclaimer, the term of this patent is extended or adjusted under 35 U.S.C. 154(b) by 0 days.

(21) Appl. No.: 14/493,510

(22) Filed: Sep. 23, 2014

(30) Foreign Application Priority Data

Oct. 25, 2013 (JP) .................................. 2013-221784
Jul. 30, 2014 (JP) .................................. 2014-154859

(51) Int. Cl.
| | |
|---|---|
| *H01G 4/008* | (2006.01) |
| *H01G 4/30* | (2006.01) |
| *H01G 4/248* | (2006.01) |
| *H01G 4/12* | (2006.01) |
| *H01G 4/012* | (2006.01) |
| *H01G 13/04* | (2006.01) |

(52) U.S. Cl.
CPC ................ *H01G 4/008* (2013.01); *H01G 4/30* (2013.01); *H01G 4/248* (2013.01); *H01G 4/12* (2013.01); *H01G 4/012* (2013.01); *H01G 13/04* (2013.01)

USPC ........................................................ 361/301.4

(58) Field of Classification Search
CPC ........... H01G 4/008; H01G 4/12; H01G 4/30; H01G 4/248; H01G 4/012
USPC .................................... 361/321.2, 306.3, 305
See application file for complete search history.

(56) References Cited

U.S. PATENT DOCUMENTS

| | | | |
|---|---|---|---|
| 2005/0083637 A1* | 4/2005 | Yoshll et al. .................. 361/600 |
| 2006/0187613 A1* | 8/2006 | Yoshii et al. .................. 361/321.2 |
| 2014/0233147 A1* | 8/2014 | Hong et al. ................. 361/301.4 |

FOREIGN PATENT DOCUMENTS

JP    11-162771 A    6/1999

* cited by examiner

*Primary Examiner* — David M Sinclair
(74) *Attorney, Agent, or Firm* — Keating & Bennett, LLP

(57) ABSTRACT

A ceramic electronic component includes a ceramic body and first and second outer electrodes. The first and second outer electrodes are located on the ceramic body. The first outer electrode includes a first resin electrode layer, and the second outer electrode includes a second resin electrode layer. Each of the resin electrode layers includes a conductive material and a resin. The moisture content of the resin electrode layers is about 0.005 mass % or less.

4 Claims, 4 Drawing Sheets

CERAMIC ELECTRONIC COMPONENT

BACKGROUND OF THE INVENTION

1. Field of the Invention

The present invention relates to a ceramic electronic component and a taped electronic component series including a plurality of the ceramic electronic components.

2. Description of the Related Art

Monolithic ceramic electronic components, such as monolithic ceramic capacitors, are included in various types of electronic devices. Monolithic ceramic capacitors generally include a ceramic body and first and second electrodes that are arranged in the ceramic body and that oppose each other with ceramic portions interposed therebetween.

In recent years, environments in which monolithic ceramic electronic components are used have become more severe. For example, monolithic ceramic electronic components included in mobile devices, such as cellular phones and portable audio players, are required to be resistant to shock when the mobile devices are dropped. More specifically, it is necessary to prevent the monolithic ceramic electronic components from becoming separated from mounting boards or cracking due to shock when the mobile devices are dropped.

Monolithic ceramic electronic components, such as electronic control units (ECU), included in on-vehicle devices are required to be heat resistant. More specifically, it is necessary to prevent the monolithic ceramic electronic components from cracking even when the monolithic ceramic electronic components receive a bending stress generated by thermal contraction or expansion of mounting boards or a tensile stress applied to outer electrodes. Ceramic bodies crack when the above-described bending stress or tensile stress exceeds the strength of the ceramic bodies.

Japanese Unexamined Patent Application Publication No. 11-162771, for example, describes a monolithic ceramic electronic component including an outer electrode that includes a resin electrode layer made of a resin containing metal powder. In the monolithic ceramic electronic component according to Japanese Unexamined Patent Application Publication No. 11-162771, the resin electrode layer buffers external stress applied to a ceramic body. Therefore, the ceramic body does not easily crack.

With ceramic electronic components including outer electrodes provided with resin electrode layers, there is a risk that the outer electrodes will be damaged in a reflow-mounting or flow-mounting process.

SUMMARY OF THE INVENTION

Preferred embodiments of the present invention provide a ceramic electronic component including an outer electrode that is not easily damaged.

A ceramic electronic component according to a preferred embodiment of the present invention includes a ceramic body including first and second principal surfaces that extend in a length direction and a width direction, first and second side surfaces that extend in a thickness direction and the length direction, and first and second end surfaces that extend in the thickness direction and the width direction, a plurality of inner electrodes provided in the ceramic body, and outer electrodes connected to respective ones of the plurality of the inner electrodes and extending from respective ones of the first and the second end surfaces of the ceramic body to respective ones of the first and the second principal surfaces of the ceramic body and respective ones of the first and the second side surfaces of the ceramic body. Each of the outer electrodes includes a baked electrode layer, a resin electrode layer including a conductive material and a resin, and a plating layer that are arranged from the ceramic body side in this order. The conductive material includes first particles having a first shape and second particles having a second shape that is different from the first shape.

In the ceramic electronic component according to above-described preferred embodiment, a moisture content of the resin electrode layer is preferably about 0.0015 mass % or greater and about 0.005 mass % or less.

In the ceramic electronic component according to above-described preferred embodiment, the first shape is preferably spherical or substantially spherical, and the second shape is preferably flat or substantially flat.

A ceramic electronic component according to another preferred embodiment of the present invention includes a ceramic body including first and second principal surfaces that extend in a length direction and a width direction, first and second side surfaces that extend in a thickness direction and the length direction, and first and second end surfaces that extend in the thickness direction and the width direction, a plurality of inner electrodes and a plurality of ceramic portions provided in the ceramic body, and outer electrodes connected to respective ones of the plurality of the inner electrodes and extending from respective ones of the first and the second end surfaces of the ceramic body to respective ones of the first and the second principal surfaces of the ceramic body and respective ones of the first and the second side surfaces of the ceramic body. Each of the outer electrodes include a baked electrode layer, a resin electrode layer including a conductive material and a resin, and a plating layer that are arranged from the ceramic body side in this order. The baked electrode layer is electrically connected to respective ones of the plurality of the inner electrodes. The resin electrode layer has a thickness of about 10 m to about 150 μm, and an area ratio of the conductive material and the resin when viewed in cross section is about 6:4 to about 9:1. The conductive material includes first particles having a first shape and second particles having a second shape that is different from the first shape and an area ratio of the first particles and the second particles when viewed in cross section is about 3:7 to about 7:3. The first shape is spherical or substantially spherical, and the second shape is flat or substantially flat. A moisture content of the resin electrode layer is about 0.0015 mass % or greater and about 0.005 mass % or less.

A ceramic electronic component according to another preferred embodiment of the present invention includes a ceramic body including first and second principal surfaces that extend in a length direction and a width direction, first and second side surfaces that extend in a thickness direction and the length direction, and first and second end surfaces that extend in the thickness direction and the width direction, a plurality of inner electrodes and a plurality of ceramic portions provided in the ceramic body, and outer electrodes connected to respective ones of the plurality of the inner electrodes and extending from respective ones of the first and the second end surfaces of the ceramic body to respective ones of the first and the second principal surfaces of the ceramic body and respective ones of the first and the second side surfaces of the ceramic body. Each of the outer electrodes include a baked electrode layer, a resin electrode layer including a conductive material and a resin, and a plating layer that are arranged from the ceramic body side in this order. The ceramic body has a thickness of about 0.2 mm to about 3.0 mm, a length of about 0.4 mm to about 5.7 mm, and a width of about 0.2 mm to about 5.0 mm. A thickness of each of the plurality of ceramic portions is about 0.4 μm to about 100 μm. The conductive material includes first particles having a first shape and second particles having a second shape and an area ratio of the first particles and the second particles when viewed in cross section is about 3:7 to about 7:3. The resin is an epoxy resin. A thickness of each resin electrode layer is about 10 μm to about 150 μm. A thickness of each plating layer is about 1 μm to about 15 μm. The first shape is spherical or substantially spherical, and the second shape is flat or substantially flat. A moisture content of the resin electrode layer is about 0.0015 mass % or greater and about 0.005 mass % or less.

According to various preferred embodiments of the present invention, a ceramic electronic component including an outer electrode that is not easily damaged is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
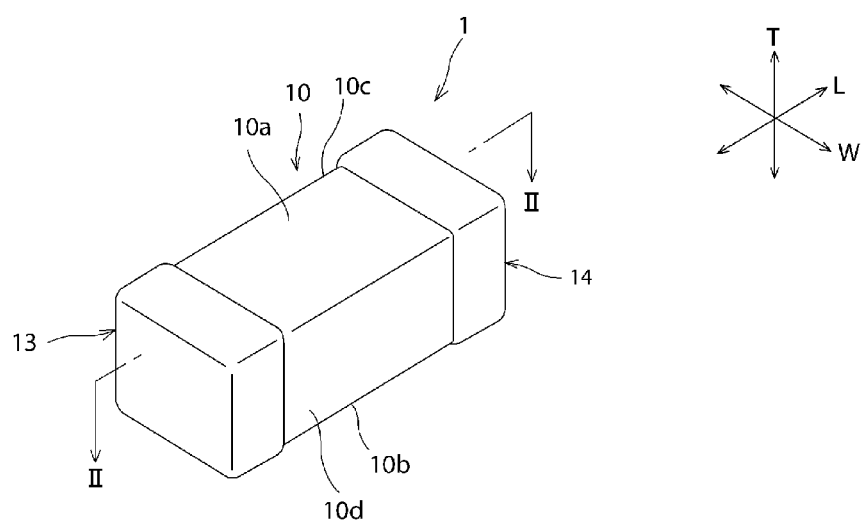
FIG. 1 is a schematic perspective view of a ceramic electronic component according to a preferred embodiment of the present invention.

Preferred embodiments of the present invention will now be described. The preferred embodiments are merely examples, and the present invention is not limited to the preferred embodiments in any way.

In each of the figures referred to in the preferred embodiments, components having substantially the same functions are denoted by the same reference numerals. The figures referred to in describing the preferred embodiments are drawn schematically. Dimensional ratios and the like of objects drawn in the figures may differ from the actual dimensional ratios and the like of the objects. The dimensional ratios and the like of the objects may also differ between the figures. Specific dimensional ratios and the like of the objects are to be determined in consideration of the following description.

The structure of a ceramic electronic component 1 will now be described.

Figure 2:
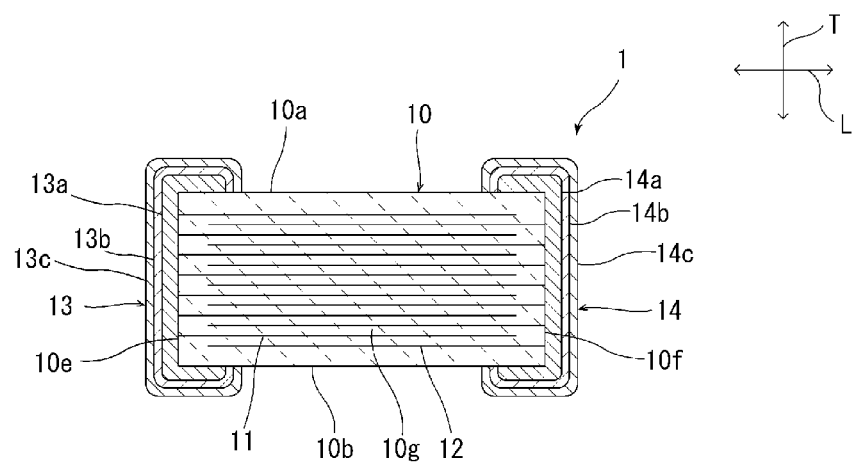
FIG. 2 is a schematic sectional view of FIG. 1 taken along line II-II.

FIG. 1 is a schematic perspective view of a ceramic electronic component according to a preferred embodiment of the present invention. FIG. 2 is a schematic sectional view of FIG. 1 taken along line II-II.

The ceramic electronic component 1 illustrated in FIGS. 1 and 2 may be a ceramic capacitor, a piezoelectric component, a thermistor, an inductor, or the like.

The ceramic electronic component 1 includes a ceramic body 10 preferably having a rectangular or substantially rectangular parallelepiped shape. The ceramic body 10 includes first and second principal surfaces 10a and 10b, first and second side surfaces 10c and 10d (see FIG. 2), and first and second end surfaces 10e and 10f (see FIG. 2). The first and second principal surfaces 10a and 10b extend in a length direction L and a width direction W. The first and second side surfaces 10c and 10d extend in a thickness direction T and the length direction L. The first and second end surfaces 10e and 10f extend in the thickness direction T and the width direction W. The length direction L, the width direction W, and the thickness direction T are orthogonal to each other.

In the present invention, the "rectangular parallelepiped shape" includes rectangular or substantially rectangular parallelepiped shapes having rounded corners and edges. In other words, objects having a "rectangular parallelepiped shape" are all objects including the first and second principal surfaces, the first and second side surfaces, and the first and second end surfaces. In addition, projections and recesses, for example, may be arranged over the entire or partial area of each of the principal surfaces, the side surfaces, and the end surfaces.

The dimensions of the ceramic body 10 are not particularly limited. For example, the ceramic body 10 preferably has a thickness of about 0.2 mm to about 3.0 mm, a length of about 0.4 mm to about 5.7 mm, and a width of about 0.2 mm to about 5.0 mm.

The ceramic body 10 is made of a ceramic suitable for the function of the ceramic electronic component 1. More specifically, in the case where the ceramic electronic component is a capacitor, the ceramic body 10 may be made of a dielectric ceramic. Non-limiting examples of dielectric ceramics include $BaTiO_3$, $CaTiO_3$, $SrTiO_3$, and $CaZrO_3$. The ceramic body 10 may also contain a sub-component, such as a Mn compound, a Mg compound, a Si compound, a Fe compound, a Cr compound, a Co compound, a Ni compound, or a rare-earth compound, as appropriate in accordance with the characteristics required of the ceramic electronic component 1.

In the case where the ceramic electronic component 1 is a piezoelectric component, the ceramic body may be made of a piezoelectric ceramic. Non-limiting examples of piezoelectric ceramics include a lead zirconate titanate (PZT) ceramic.

In the case where the ceramic electronic component 1 is a thermistor, the ceramic body may be made of a semiconductor ceramic. Non-limiting examples of semiconductor ceramics include a spinel ceramic.

In the case where the ceramic electronic component is an inductor, the ceramic body may be made of a magnetic ceramic. Non-limiting examples of magnetic ceramics include a ferrite ceramic.

As illustrated in FIG. 2, a plurality of first inner electrodes 11 and a plurality of second inner electrodes 12 are provided in the ceramic body 10.

The first inner electrodes 11 preferably have a rectangular or substantially rectangular shape. The first inner electrodes 11 are parallel or substantially parallel to the first and second principal surfaces 10a and 10b (see FIG. 1). In other words, the first inner electrodes 11 extend in the length direction L and the width direction W. The first inner electrodes 11 are exposed at the first end surface 10e, and are not exposed at the first and second principal surfaces 10a and 10b, the first and second side surfaces 10c and 10d, and the second end surface 10f.

The second inner electrodes 12 preferably have a rectangular or substantially rectangular shape. The second inner electrodes 12 are parallel or substantially parallel to the first and second principal surfaces 10a and 10b (see FIG. 1). In other words, the second inner electrodes 12 extend in the length direction L and the width direction W. Thus, the second inner electrodes 12 and the first inner electrodes 11 are parallel or substantially parallel to each other. The second inner electrodes 12 are exposed at the second end surface 10f, and are not exposed at the first and second principal surfaces 10a and 10b, the first and second side surfaces 10c and 10d, and the first end surface 10e.

The first and second inner electrodes 11 and 12 are alternately arranged in the thickness direction T. The first and second inner electrodes 11 and 12 that are adjacent to each other in the thickness direction T oppose each other with a ceramic portion 10g interposed therebetween. The thickness of each ceramic portion 10g may be about 0.4 μm to about 100 μm, and is preferably about 1.5 μm to about 80 μm, for example. In the case where the ceramic electronic component 1 is a capacitor, each ceramic portion 10g is preferably thin from the viewpoint of increasing the capacity of the ceramic electronic component 1.

The first and second inner electrodes 11 and 12 may be formed of an appropriate conductive material. For example, the first and second inner electrodes 11 and 12 may be formed of a metal selected from a group including Ni, Cu, Ag, Pd, and Au, or an alloy, such as an Ag—Pd alloy, containing one or more metals selected from the group including Ni, Cu, Ag, Pd, and Au.

Preferably, the thickness of the first and second inner electrodes 11 and 12 is, for example, about 0.2 μm to about 2.0 μm.

As illustrated in FIGS. 1 and 2, the ceramic electronic component 1 includes first and second outer electrodes 13 and 14. The first outer electrode 13 is electrically connected to the first inner electrodes 11 on the first end surface 10e. The second outer electrode 14 is electrically connected to the second inner electrodes 12 on the second end surface 10f.

The first outer electrode 13 is arranged so as to extend from the first end surface 10e to the first and second principal surfaces 10a and 10b and the first and second side surfaces 10c and 10d. The second outer electrode 14 is arranged so as to extend from the second end surface 10f to the first and second principal surfaces 10a and 10b and the first and second side surfaces 10c and 10d.

The first and second outer electrodes 13 and 14 may be formed of an appropriate conductive material. Also, the first and second outer electrodes 13 and 14 may be formed of a plurality of conductive films.

More specifically, the first outer electrode 13 includes a first baked electrode layer 13a, and the second outer electrode 14 includes a second baked electrode layer 14a.

The first baked electrode layer 13a is arranged so as to cover the end surface 10e of the ceramic body and extend to certain positions on the principal surfaces 10a and 10b and the side surfaces 10c and 10d. The second baked electrode layer 14a is arranged so as to cover the end surface 10f of the ceramic body 10 and extend to certain positions on the principal surfaces 10a and 10b and the side surfaces 10c and 10d.

A first resin electrode layer 13b is provided on the first baked electrode layer 13a. A second resin electrode layer 14b is provided on the second baked electrode layer 14a. A first plating layer 13c is provided on the first resin electrode layer 13b. A second plating layer 14c is provided on the second resin electrode layer 14b.

The first and second baked electrode layers 13a and 14a are preferably formed by, for example, applying conductive paste containing a conductive metal and a glass and burning the conductive paste. The conductive metal contained in the first and second baked electrode layers 13a and 14a may be, for example, Cu, Ni, Ag, Pd, an Ag—Pd alloy, or Au. The glass contained in the first and second baked electrode layers 13a and 14a may be, for example, a glass containing B, Si, Ba, Mg, Al, or Li.

Each of the first and second baked electrode layers 13a and 14a may either be baked together with the ceramic body 10, or may be formed by applying the conductive paste to the ceramic body 10 and baking the conductive paste.

Each of the first and second baked electrode layers 13a and 14a may include a plurality of layers. In this case, the thickness of the first electrode layer, more specifically, the thickness of the thickest portion of the first electrode layer, is preferably about 10 μm to about 100 μm, for example. Similar to the first and second baked electrode layers 13a and 14a, each of the first and second resin electrode layers 13b and 14b and the first and second plating layers 13c and 14c may also include a plurality of layers.

The first resin electrode layer 13b covers the first baked electrode layer 13a. The second resin electrode layer 14b covers the second baked electrode layer 14a. More specifically, the first resin electrode layer 13b is disposed on a portion of the first baked electrode layer 13a disposed on the first end surface, and preferably extends to portions of the first baked electrode layer 13a disposed on the first principal surface and the first side surface. The second resin electrode layer 14b is disposed on a portion of the second baked electrode layer 14a disposed on the second end surface, and preferably extends to portions of the second baked electrode layer 14a disposed on the second principal surface and the second side surface. The first resin electrode layer 13b may be provided only on the portion of the first baked electrode layer 13a disposed on the first end surface, and the second resin electrode layer 14b may be provided only on the portion of the second baked electrode layer 14a disposed on the second end surface.

Preferably, the thickness of the first and second resin electrode layers 13b and 14b is, for example, about 10 μm to about 150 μm.

The first and second resin electrode layers 13b and 14b preferably include a conductive material and a resin. The area ratio of the conductive material and the resin when viewed in cross section is preferably about 6:4 to about 9:1, for example. Since the first and second resin electrode layers 13b and 14b include a resin, the first and second resin electrode layers 13b and 14b are more flexible than, for example, the plating layers and the conductive layers formed by baking conductive paste. Therefore, even when the ceramic electronic component 1 receives a physical shock or a shock due to the heat cycle, the first and second resin electrode layers 13b and 14b serve as buffer layers, and cracking of the ceramic electronic component 1 is prevented.

The conductive material may be, for example, Ag, Cu or metal powder coated with Ag. The metal powder is preferably Cu or Ni. The conductive material may instead be Cu subjected to an anti-oxidation treatment.

The reason why Ag is preferably used as the conductive material is because Ag is suitable for use as an electrode material because of its low specific resistance. In addition, since Ag is a noble metal, it is not easily oxidized and is highly weatherproof.

The shape of the particles of the conductive material is not particularly limited, and may be, for example, spherical or flat. Preferably, the conductive material preferably is a mixture of particles including first particles having a first shape and second particles having a second shape that is different from the first shape. For example, the first shape can be spherical or substantially spherical, and the second shape can be flat or substantially flat. For example, a substantially flat shape is a shape which has at least one flat surface. When the resin electrode layer is viewed in cross section, the particles of the conductive material contained in the resin electrode layer having a ratio of short side to long side of about 1:5 or greater are regarded as flat particles, while the particles having a ratio of short side to long side of about 1:5 or less are regarded as spherical particles. An area ratio of the first particles and the second particles when viewed in cross section is preferably about 3:7 to about 7:3, for example. As a result of this area ratio, a highly advantageous balance between stress relief and reliable electrical connection is achieved. The average particle diameter of the conductive material is not particularly limited, and may be, for example, about 1.0 µm to about 10 µm.

The particles of the conductive material contact each other, thus providing conduction paths in the first and second resin electrode layers 13b and 14b.

Various types of known thermosetting resins, such as an epoxy resin, a phenolic resin, a urethane resin, a silicone resin, and a polyimide resin, may be used as the resin contained in the first and second resin electrode layers 13b and 14b. In particular, an epoxy resin, which has a high heat resistance, a high moisture resistance, and a high adherence, is one of the most suitable resins.

The first and second resin electrode layers 13b and 14b preferably include a curing agent in addition to the thermosetting resin. In the case where an epoxy resin is used as a base resin, various types of compounds, such as a phenolic compound, an amine compound, an acid anhydride compound, or an imidazole compound, may be used as a curing agent for the epoxy resin.

There has been a risk that the outer electrodes of the ceramic electronic component will be damaged in a reflow process, a flow process, or an aging process. As a result of intensive studies, the inventors of the present invention have discovered that the outer electrodes are damaged due to expansion of moisture when heating is performed in, for example, the reflow process. In particular, it has been discovered that the moisture easily enters the resin electrode layers of the outer electrodes when plating layers are formed on the resin electrode layers.

Accordingly, in the present preferred embodiment, the moisture content of the first and second resin electrode layers 13b and 14b preferably is set to about 0.005 mass % or less, for example. In this case, in the ceramic electronic component 1 including the outer electrodes containing a resin, even when the moisture vaporizes and expands in the mounting process, the occurrence of breakage of the resin is eliminated or greatly reduced. In other words, the outer electrodes are not easily damaged. Accordingly, reduction in the fixing force between the ceramic electronic component 1 and the mounting board is prevented, and the risk of separation of the ceramic electronic component 1 from the mounting board is eliminated.

The moisture content of the first and second resin electrode layers 13b and 14b is preferably about 0.0015 mass % or more, for example. This is because it is necessary to perform reduced pressure drying for an extremely long time to reduce the moisture content to less than about 0.0015 mass %. In this case, the productivity will be reduced.

When the moisture content is more than about 0.005 mass %, the amount of moisture in the first and second resin electrode layers 13b and 14b is large. Therefore, the first and second resin electrode layers 13b and 14b easily break as a result of vaporization and expansion of the moisture when heating is performed in the reflow process or flow process.

The amount of moisture in the first and second resin electrode layers 13b and 14b is adjusted by performing heating in a pressure-reduced atmosphere (about $1\times10^1$ Pa to about $1\times10^{-1}$ Pa, for example).

The amount of moisture in the first and second resin electrode layers 13b and 14b preferably is measured by using, for example, a Karl Fischer testing apparatus having a moisture vaporization device. In the present preferred embodiment, to take the expansion of moisture in the reflow process into consideration, the chip is heated, for example, to about 260° C. for six minutes, and the generated moisture is quantified by using a Karl Fischer reagent. The amount of moisture in the first and second resin electrode layers 13b and 14b is determined in terms of the percentage of the mass of the moisture in the mass of the ceramic electronic component.

The first plating layer 13c covers the first resin electrode layer 13b. The second plating layer 14c covers the second resin electrode layer 14b.

Each of the first and second plating layers 13c and 14c may include a plurality of layers, as described above, and preferably includes a lower plating film and an upper plating film located on the lower plating film. In this case, each of the lower plating film and the upper plating film is preferably made of, for example, a single type of metal selected from a group including Cu, Ni, Sn, Pb, Au, Ag, Pd, Bi, and Zn, or an alloy plating containing the selected metal. More specifically, the upper plating film is preferably made of Sn or Au, which have high solder wettability. The lower plating film is preferably made of Ni, which has a high barrier performance against solder.

The thickness of each layer (each plating film) included in each of the first and second plating layers 13c and 14c is preferably about 1 µm to about 15 µm, for example.

The manufacturing method of the ceramic electronic component 1 is not particularly limited. The ceramic electronic component 1 can be manufactured by, for example, the following method.

First, the ceramic body 10 including the first and second inner electrodes 11 and 12 is prepared. More specifically, ceramic green sheets are manufactured by spreading ceramic paste containing ceramic powder in a sheet shape by, for example, screen printing and drying the ceramic paste.

Next, conductive paste for forming the inner electrodes is applied to some of the ceramic green sheets in a certain pattern by, for example, screen printing. Thus, ceramic green sheets on which an inner-electrode-forming conductive pattern is formed and ceramic green sheets on which the inner-electrode-forming conductive pattern is not formed are prepared. A known binder or solvent may be contained in the ceramic paste or the conductive paste for forming the inner electrodes.

Next, a mother multilayer body is formed by stacking a certain number of ceramic green sheets on which the inner-electrode-forming conductive pattern is not formed, ceramic green sheets on which the inner-electrode-forming conductive pattern is formed and which are arranged sequentially, and a certain number of ceramic green sheets on which the inner-electrode-forming conductive pattern is not formed, in that order. The mother multilayer body may be pressed in the stacking direction by, for example, isostatic pressing as necessary.

A plurality of raw ceramic bodies are formed by cutting the mother multilayer body into a predetermined shape and size. The edges and corners of the raw ceramic bodies may be rounded by subjecting the raw ceramic bodies to barrel grinding or the like.

Then, the raw ceramic bodies are baked. Thus, the ceramic body 10 is completed. The baking temperature of the raw ceramic bodies may be set in accordance with the ceramic and the conductive material that are used. For example, the baking temperature of the raw ceramic bodies may be set to about 900° C. to about 1300° C.

Next, the first and second baked electrode layers 13a and 14a are formed by applying conductive paste to both end surfaces of the baked ceramic body 10 and burning the conductive paste. Preferably, the burning temperature is, for example, about 700° C. to about 1000° C.

Next, conductive resin paste containing a conductive material and a resin is applied so as to cover the first and second baked electrode layers 13a and 14a, and are subjected to heat treatment at a temperature of about 150° C. to about 300° C. so that the resin is thermally cured. Thus, the first resin electrode layer 13b is formed on the first baked electrode layer 13a, and the second resin electrode layer 14b is formed on the second baked electrode layer 14a.

Next, the first plating film 13c is formed so as to cover the first resin electrode layer 13b, and the second plating film 14c is formed so as to cover the second resin electrode layer 14b. The first and second plating layers 13c and 14c are formed so as to have a multilayer structure including a Ni plating layer and a Sn plating layer.

After the first and second plating layers 13c and 14c are formed, heating is performed in a pressure-reduced atmosphere, so that the moisture content in the first and second resin electrode layers 13b and 14b preferably is adjusted to about 0.005 percent or less, for example.

The ceramic electronic component 1 can be completed by the above-described processes.

Figure 3:
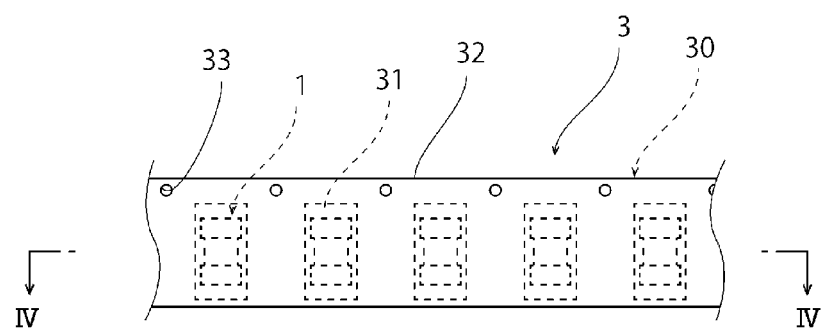
FIG. 3 is a schematic plan view of a taped electronic component series according to a preferred embodiment of the present invention.
Figure 4:
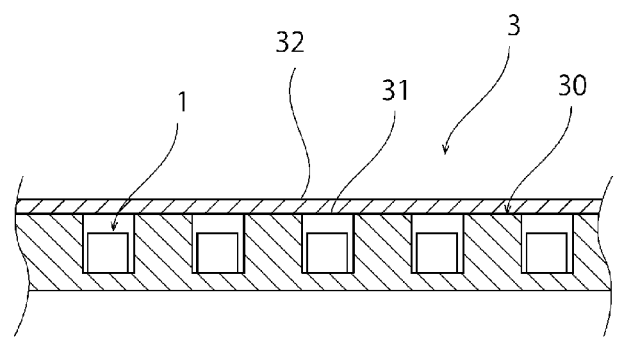
FIG. 4 is a schematic sectional view of FIG. 3 taken along line IV-IV.

FIG. 3 is a schematic plan view of a taped electronic component series according to the present preferred embodiment. FIG. 4 is a schematic sectional view of FIG. 3 taken along line IV-IV.

The taped electronic component series 3 includes an elongated carrier tape 30. The carrier tape 30 includes a plurality of cavities 31 that are arranged with constant intervals therebetween in a length direction. In the present preferred embodiment, each cavity 31 preferably has a rectangular or substantially rectangular shape in plan view, and is open at one side of the carrier tape 30. Each cavity 31 accommodates a ceramic electronic component 1. The size of the cavities 31 is such that the ceramic electronic components 1 are capable of being accommodated in the respective cavities 31, and is determined in accordance with the shape and size of the ceramic electronic components 1 to be accommodated. The clearances between the cavities 31 and the respective ceramic electronic components 1 preferably are about 10% to about 35% of the size of the ceramic electronic components 1. Therefore, the centers of the cavities 31 coincide or substantially coincide with the centers of the respective ceramic electronic components 1 accommodated in the cavities 31.

A cover tape 32 is bonded to the carrier tape 30 to hold the ceramic electronic components 1 in place. The ceramic electronic components 1 can be taken out by peeling the cover tape 32 off the carrier tape 30. A plurality of feed holes 33 are provided in the carrier tape 30 with constant or substantially constant intervals therebetween in the length direction. The carrier tape 30 is formed of an appropriate material such as paper or synthetic resin. The carrier tape 30 may be formed of a multilayer material. In the case where the carrier tape 30 is formed of a multilayer material, the carrier tape 30 may be structured such that a member including through holes that form the cavities is stacked on another material for forming the bottom surfaces of the cavities 31.

The cover tape 32 is formed of an appropriate material such as a synthetic resin film, and is bonded to the carrier tape 30 with an adhesive.

The present invention will now be described in more detail by way of non-limiting examples. However, the present invention is not limited to the following examples in any way, and modifications can be made as appropriate within the scope of the present invention.

Examples 1 to 5

As examples of the ceramic electronic component 1 according to the above-described preferred embodiment, ceramic capacitors similar to the ceramic electronic component 1 according to the above-described preferred embodiment were manufactured by using the manufacturing method according to the above-described preferred embodiment. Three hundred ceramic capacitors were manufactured for each example under the conditions given below. Five types of moisture content in the resin electrode layers were set (Examples 1 to 5) by changing the conditions of reduced pressure drying performed after the plating process (see Table 1 below), and the relationship between the moisture content, the number of occurrences of breakage of the resin after the reflow process, and the fixing force after the mounting process was determined. One hundred ceramic capacitors were evaluated to determine each of the moisture content in the resin electrode layers, the number of occurrences of breakage of the resin after the reflow process, and the fixing force after the mounting process.

Size of Ceramic Capacitors: 3.2 mm (L)×2.5 mm (W)×2.5 mm (T) (design values)
Ceramic: $BaTiO_3$
Capacity: 10 μF
Rated Voltage: 25 V
Baking Temperature: 1200° C. (kept for 2 hours)
Material of Baked Electrode Layers: Cu
Target Thickness of Baked Electrode Layers: 110 μm (Target Value in Central Regions of End Surfaces)
Conductive Material Contained in Resin Electrode Layers: Ag
Resin Contained in Resin Electrode Layers: Epoxy Resin
Heat-Curing Temperature: 200° C.
Target Thickness of Resin Electrode Layers: 80 μm (Target Value in Central Regions of End Surfaces)
Structure of Plating Layers: Two-Layer Structure Including Ni and Sn Layers
Target Thickness of Plating Layers: 3 μm (Ni) and 4 μm (Sn) (Target Value in Central Regions of End Surfaces)
Drying Temperature in Pressure-Reduced Atmosphere after Plating Layers Were Formed: See Table 1
Drying Time in Pressure-Reduced Atmosphere after Plating Layers Were Formed: See Table 1
Drying Atmosphere in Pressure-Reduced Atmosphere after Plating Layers Were Formed: $1 \times 10^0$ Pa The amount of moisture in the resin electrode layers was measured by taking out the taped ceramic electronic components, which are completed chips, heating the ceramic electronic components to about 260° C. for approximately six minutes, and measuring the amount of moisture generated in the heating process with a Karl Fischer testing apparatus having a moisture vaporization device. Since the expansion of moisture in the reflow process is to be taken into consideration, the ceramic electronic components were heated to about 260° C. for approximately six minutes, and the generated moisture was quantified by using a Karl Fischer reagent. Each of the values shown in Table 1 is the average of 100 samples.

The ceramic electronic components were mounted on land boards according to Japanese Industrial Standard (JIS) by applying Sn-3Ag-0.5Cu solder paste to the land boards to a thickness of about 200 μm, placing the ceramic electronic components on the land boards, and feeding them into a reflow oven. Then, a side surface of each ceramic electronic component was ground in a direction perpendicular or substantially perpendicular to the board surface to a central position of the ceramic electronic component in the width direction, and the ground surface was observed. The number of cracks formed in the interfaces between the baked electrode layers and the resin electrode layers or in the resin electrode layers was counted. Here, the cracks in the resin are not those in the form of spheres, such as pin-holes formed when the resin is applied, but are those formed when the resin is torn by a force applied due to expansion of the moisture after the curing process.

To measure the fixing strength, Sn-3Ag-0.5Cu solder paste was applied to land boards according to JIS to a thickness of about 200 µm, and the ceramic electronic components were mounted on the land boards by a reflow process. Then, the mounted ceramic electronic components were pushed sideways with a pushing jig, and the force applied when each ceramic electronic component were separated from the board was measured. Each of the values shown in Table 1 is the average of 100 samples.

Comparative Examples 1 and 2

As comparative examples for the ceramic electronic component 1 according to the above-described preferred embodiment, ceramic capacitors similar to the ceramic electronic component 1 according to the above-described preferred embodiment were manufactured by using the manufacturing method according to the above-described preferred embodiment. Three hundred ceramic capacitors were manufactured for each comparative example under the same conditions as the conditions for manufacturing the ceramic capacitors of the above-described examples. Two types of moisture content in the resin electrode layers were set (Comparative Examples 1 and 2) by changing the conditions of reduced pressure drying performed after the plating process (see Table 1 below), and the relationship between the moisture content, the number of occurrences of breakage of the resin after the reflow process, and the fixing force after the mounting process was determined. One hundred ceramic capacitors were evaluated to determine each of the moisture content in the resin electrode layers, the number of occurrences of breakage of the resin after the reflow process, and the fixing force after the mounting process.

Comparative Example 3

Three hundred ceramic capacitors were manufactured under the same conditions as the conditions for manufacturing the ceramic capacitors of the above-described examples except that reduced pressure drying was not performed after the plating process. Then, the relationship between the moisture content of the resin electrode layers, the number of occurrences of breakage of the resin after the reflow process, and the fixing force after the mounting process was determined. One hundred ceramic capacitors were evaluated to determine each of the moisture content in the resin electrode layers, the number of occurrences of breakage of the resin after the reflow process, and the fixing force after the mounting process.

The results of Examples 1 to 5 and Comparative Examples 1 to 3 are shown in Table 1.

TABLE 1

| | Conditions of Reduced Pressure Drying (Temperature, Time) | Moisture Content of Resin Electrode Layers (mass %) | No. of Occurrences of Breakage of Resin/No. of Samples | Minimum Fixing Strength (N) |
|---|---|---|---|---|
| Example 1 | 160° C., 8 hr | 0.0015 | 0/100 | 125 |
| Example 2 | 160° C., 6 hr | 0.0026 | 0/100 | 122 |
| Example 3 | 160° C., 4 hr | 0.0036 | 0/100 | 121 |
| Example 4 | 160° C., 4 hr | 0.0046 | 0/100 | 121 |
| Example 5 | 160° C., 4 hr | 0.0050 | 0/100 | 118 |
| Comparative Example 1 | 160° C., 4 hr | 0.0054 | 21/100 | 52 |
| Comparative Example 2 | 160° C., 2 hr | 0.0060 | 47/100 | 43 |
| Comparative Example 3 | No Drying | 0.0084 | 78/100 | 40 |

As is clear from the results, in a ceramic electronic component including outer electrodes containing a resin, when the moisture content of resin electrode layers is about 0.005 mass % or less, the occurrence of breakage of the resin is significantly reduced or prevented even when the moisture vaporizes and expands in the mounting process. Accordingly, it was confirmed that reduction in the fixing force between the ceramic electronic component and the mounting board is significantly reduced, and separation of the ceramic electronic component from the mounting board is prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body including first and second principal surfaces that extend in a length direction and a width direction, first and second side surfaces that extend in a thickness direction and the length direction, and first and second end surfaces that extend in the thickness direction and the width direction;
a plurality of inner electrodes provided in the ceramic body; and
outer electrodes connected to respective ones of the plurality of the inner electrodes and extending from respective ones of the first and the second end surfaces of the ceramic body to respective ones of the first and the second principal surfaces of the ceramic body and respective ones of the first and the second side surfaces of the ceramic body; wherein
each of the outer electrodes includes a baked electrode layer, a resin electrode layer including a conductive material and a resin, and a plating layer that are arranged from the ceramic body side in this order;
the conductive material includes first particles having a first shape and second particles having a second shape that is different from the first shape; and
a moisture content of the resin electrode layer is about 0.0015 mass % or greater and about 0.005 mass % or less.

2. The ceramic electronic component according to claim 1, wherein the first shape is spherical or substantially spherical, and the second shape is flat or substantially flat.

3. A ceramic electronic component comprising:
a ceramic body including first and second principal surfaces that extend in a length direction and a width direction, first and second side surfaces that extend in a thickness direction and the length direction, and first and second end surfaces that extend in the thickness direction and the width direction;

a plurality of inner electrodes and a plurality of ceramic portions provided in the ceramic body; and outer electrodes connected to respective ones of the plurality of the inner electrodes and extending from respective ones of the first and the second end surfaces of the ceramic body to respective ones of the first and the second principal surfaces of the ceramic body and respective ones of the first and the second side surfaces of the ceramic body; wherein each of the outer electrodes include a baked electrode layer, a resin electrode layer including a conductive material and a resin, and a plating layer that are arranged from the ceramic body side in this order;

the baked electrode layer is electrically connected to respective ones of the plurality of the inner electrodes;

the resin electrode layer has a thickness of about 10 μm to about 150 μm, and an area ratio of the conductive material and the resin when viewed in cross section is about 4:6 to about 1:9;

the conductive material includes first particles having a first shape and second particles having a second shape that is different from the first shape and an area ratio of the first particles and the second particles when viewed in cross section is about 3:7 to about 7:3;

the first shape is spherical or substantially spherical, and the second shape is flat or substantially flat; and a moisture content of the resin electrode layer is about 0.0015 mass % or greater and about 0.005 mass % or less.

4. A ceramic electronic component comprising:

a ceramic body including first and second principal surfaces that extend in a length direction and a width direction, first and second side surfaces that extend in a thickness direction and the length direction, and first and second end surfaces that extend in the thickness direction and the width direction;

a plurality of inner electrodes and a plurality of ceramic portions provided in the ceramic body; and outer electrodes connected to respective ones of the plurality of the inner electrodes and extending from respective ones of the first and the second end surfaces of the ceramic body to respective ones of the first and the second principal surfaces of the ceramic body and respective ones of the first and the second side surfaces of the ceramic body; wherein each of the outer electrodes include a baked electrode layer, a resin electrode layer including a conductive material and a resin, and a plating layer that are arranged from the ceramic body side in this order;

the ceramic body has a thickness of about 0.2 mm to about 3.0 mm, a length of about 0.4 mm to about 5.7 mm, and a width of about 0.2 mm to about 5.0 mm;

a thickness of each of the plurality of ceramic portions is about 0.4 μm to about 100 μm;

the conductive material includes first particles having a first shape and second particles having a second shape and an area ratio of the first particles and the second particles when viewed in cross section is about 3:7 to about 7:3;

the resin is an epoxy resin;

a thickness of each resin electrode layer is about 10 μm to about 150 μm;

a thickness of each plating layer is about 1 μm to about 15 μm;

the first shape is spherical or substantially spherical, and the second shape is flat or substantially flat; and a moisture content of the resin electrode layer is about 0.0015 mass % or greater and about 0.005 mass % or less.

\* \* \* \* \*